Nov. 13, 1956 W. J. CASEY, III 2,770,329
HYDRAULIC MAGNETIC FLUID BRAKE
Filed July 25, 1952
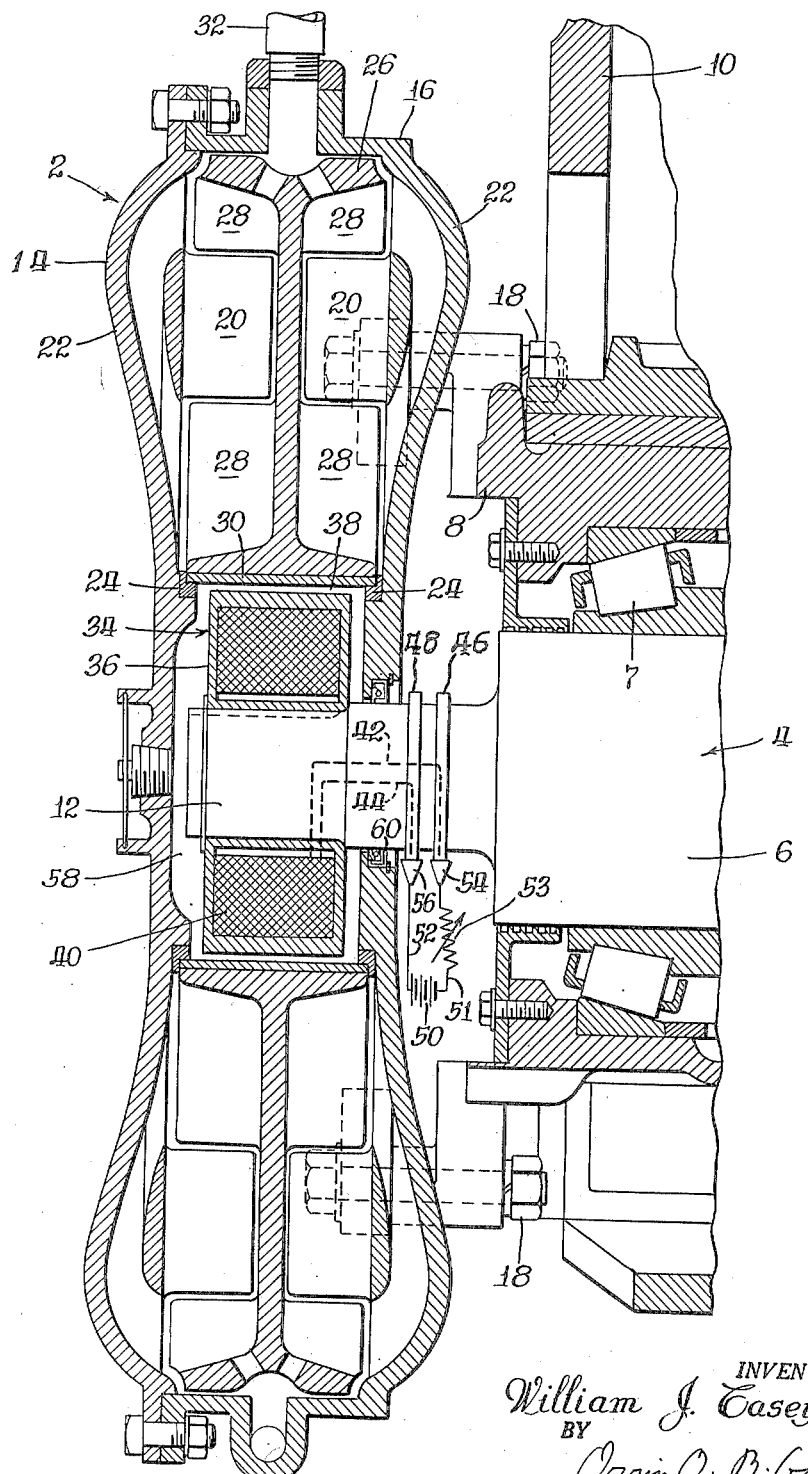
INVENTOR.
William J. Casey, III.
BY
Orrin O. B. Garner
Atty.

United States Patent Office 2,770,329
Patented Nov. 13, 1956

2,770,329

HYDRAULIC MAGNETIC FLUID BRAKE

William J. Casey III, Chicago, Ill., assignor to American Steel Foundries, Chicago, Ill., a corporation of New Jersey Application July 25, 1952, Serial No. 300,942

7 Claims. (Cl. 188—90)

This invention relates to a hydraulic magnetic fluid brake and more specifically to an electromagnetically controlled torque-applying brake arrangement suitable for use on railway vehicles.

This invention contemplates the provision of a brake arrangement including a hydraulic torque converter adapted to brake a vehicle at any particular torque value up to the maximum torque output of the converter.

This invention further contemplates the provision of a brake arrangement in which the relative angular velocity between the impeller and casing of the torque converter may be controlled from a remote electric current source by means including a magnetic fluid clutch.

This invention further contemplates the provision of a brake arrangement which is easy to control, smooth in operation, requires a very small amount of electrical power, and produces a torque output substantially proportional to the control current over a wide range of torque values.

Briefly, the present invention contemplates the provision of a brake arrangement comprising a hydraulic torque converter having an impeller rotatably mounted within a casing to circulate fluid therebetween, the impeller having secured thereto a paramagnetic metal sleeve enclosing and coaxial with a shaft to be decelerated. A cylindrical coil housing of paramagnetic material is keyed on the shaft within the sleeve to house a winding or coil adapted to be energized by an electric current to set up a magnetic field between the housing and the impeller sleeve to cause paramagnetic particles in a fluid mixture to produce a coupling force between the housing and impeller sleeve. To vary the coupling force between the shaft and the impeller, a control means such as a rheostat is interposed in the circuit leading from a source of current to the coil.

This invention embodies other novel features, details of construction and arrangement of parts which are hereinafter set forth in the specification and claims and illustrated in the accompanying drawing, wherein:

The single figure in the drawing is a sectional view illustrating a hydraulic magnetic fluid brake embodying features of the present invention, the brake being shown as applied to decelerate a rotatable shaft such as an axle of a railway car truck.

Referring now to the drawing for a better understanding of the present invention, the hydraulic magnetic fluid brake 2 is shown as applied to decelerate a wheel and axle assembly 4 of a railway car truck comprising a steel axle 6 journaled in anti-friction bearings 7 provided in journal boxes 8, the boxes being mounted against rotational movement on a truck frame 10 in a manner well known in the railway art. An extension 12 is formed on each end of the axle to be engaged by a brake 2 to decelerate the wheel and axle assembly.

The brake 2 is shown as comprising a hydraulic torque converter 14 having a casing 16 adapted to be secured in fixed position to a journal box 8 by means of bolts 18, the casing having side walls 22—22 formed with opposing sets of radially disposed, circumferentially spaced vanes 20. The side walls 22—22 are provided with bearings 24—24 of non-magnetic metal to rotatably support an annular impeller 26 formed on opposite sides thereof with radially disposed, circumferentially spaced blades 28 to coact with the vanes 20 to circulate a liquid within the casing.

The impeller 26 is formed of non-magnetic metal and bored to receive a fixed cylindrical paramagnetic metal sleeve 30 journaled at its ends on the bearings 24—24. The portion of the casing encircling the sleeve 30 is provided with a fixed but selectable quantity of liquid to be circulated within the casing by the impeller 26, the liquid being directed into the casing through a valve controlled conduit 32. The output torque of the hydraulic torque converter 14 is regulated by coupling means 34 operative to vary the relative angular velocity between the impeller and casing during rotation of the axle 6 at a particular speed.

The coupling means 34 is shown in the form of an electromagnetic fluid clutch in which two relatively movable, slightly spaced, paramagnetic metal surfaces are adapted to be coupled by paramagnetic particles, such as soft iron particles, mixed in a fluid vehicle, such as oil. When the paramagnetic particles are included in a magnetic circuit between closely spaced relatively movable surfaces, they are attracted one to the other and act to build up a contact pressure between particles inter se and between the particles and said surfaces, tending to lock the surfaces together.

The electromagnetic fluid clutch 34 is shown as comprising a hollow cylindrical housing 36 formed of paramagnetic metal and keyed to the axle extension 12 to define with the sleeve 30 an annular gap 38. Enclosed within the housing 36 is provided a ring-shape winding or coil 40 to be energized from a current source, such as a battery 50. The coil 40 is connected by leads 42 and 44 to slip rings 46 and 48, respectively, secured in axially spaced relation on the axle extension 12. The battery 50 is connected by leads 51 and 52 to brushes 54 and 56, respectively, which contact the slip rings 46 and 48, respectively. The flow of current from the battery 50 may be controlled by means of a rheostat 53 interposed in the lead 51, but it will be understood that the battery and rheostat are herein used as conventional symbols to represent any suitable source of alternating or direct current and means for controlling said current.

The space surrounding the housing 36 is filled with a magnetic fluid mixture 58 which may consist of a suitable fluid vehicle, such as oil, and a quantity of finely divided paramagnetic particles such, for example, as commercially available soft iron dust sold by General Aniline and Film Company, New York, as "Carbonyl Iron Powders," grade E, 8 microns average size. A magnetic fluid mixture containing approximately 50% by volume of dust is suitable for use, although the percentage of dust may vary greatly and still provide an operative mixture. The casing 16 is provided with an annular oil-seal ring 60 encircling the axle extension 12 to prevent the escape of the fluid mixture 58 from the casing.

In the operation of the brake to decelerate a railway vehicle, the coil 40 is energized by an electric current from the battery 50 to cause a flow of magnetic flux in the annular space 38 to cause the paramagnetic particles in the magnetic fluid mixture 58 to collect together and build up a resistance to relative movement between the housing 36 and the sleeve 30 on the impeller 26. By gradually increasing the current in the coil 40, a definite torque will be smoothly developed between the housing 36 and the impeller 26. When the torque developed in the magnetic fluid clutch is equal to or greater than the torque induced between the impeller 26 and casing 16 by the fluid circulated therebetween, the housing 36 and impeller 26 will be "locked" together in that they will rotate at the same speed.

It will be noted that for any particular current introduced into the coil 40, a particular torque will be transmitted between the housing 36 and impeller 26, independently of the relative angular velocities of the housing and impeller. The torque reaction in the impeller will, however, cause the impeller to move relative to the casing 16 at a speed sufficient to induce a torque reaction in the casing exactly equal to that applied by the clutch 34. In the event the maximum torque developed by the magnetic fluid clutch 34 is less than the torque required to rotate the impeller 26 as fast as the housing 36, there will be relative slipping between the housing and the impeller but, however, the clutch will transmit substantially the same amount of torque and acts substantially as a constant-torque transmission system. This constant-torque value is also the maximum torque that the clutch can transmit without slipping.

In the operation of the brake, the combination of a magnetic fluid clutch with a hydraulic torque converter having a fixed volume of circulating liquid therein permits selection of any torque output equal to or less than the maximum which can be produced by the hydraulic unit alone and at any particular speed of the vehicle. Thus, for example, the brake arrangement makes it possible to brake a vehicle from its initial speed of, for example, 100 M. P. H. at any particular constant torque value down to that speed below which the hydraulic torque converter would no longer maintain the torque.

While the brake arrangement has been shown and described as comprising a magnetic fluid clutch 34 for regulating the relative velocity between the impeller 26 and casing 16 to produce a particular torque output, it is contemplated that other types of friction brakes could be employed in place of the magnetic fluid clutch to control the output torque of the brake arrangement. However, the magnetic fluid clutch has numerous advantages over many other existing types of clutches, as it is easy to control, smooth in operation, requires a very small amount of electrical power, and the torque is substantially proportional to the control current over a wide range of torque values. To enable the clutch to operate at relatively high and low temperatures, silicone liquids may be employed as the fluid vehicle in the magnetic fluid mixture 58.

While this invention has been shown in but one form it is obvious to those skilled in the art that it is not so limited but is susceptible of various changes and modifications without departing from the spirit and scope of the claimed invention.

I claim:

1. In a brake arrangement for a railway car truck having a journal box mounted on a truck frame, an axle having an extension integral and coaxial therewith and projecting outboardly from the journal box, a hydraulic torque converter including a casing enclosing and coaxial with said extension and secured to said journal box, spaced coaxial bearing formed of non-magnetic metal provided on the casing coaxial with said axle extension, a cylindrical sleeve formed of paramagnetic metal rotatably mounted on said bearings, an impeller secured on said sleeve to circulate liquid within the casing, a cylindrical housing formed of paramagnetic metal secured on said extension within said sleeve to define therewith an annular space, a coil within said housing to be energized from a source of electric current to produce a magnetic flux in said annular space between the housing and said sleeve, a mass of relatively movable paramagnetic particles in said annular space, and leads connecting said coil to a source of electric current to subject said housing and sleeve and mass of paramagnetic particles to a magnetic field to produce a coupling force between said housing and sleeve.

2. In a brake arrangement for a railway car truck having a journal box mounted on a truck frame, an axle having an extension integral and coaxial therewith and projecting outboardly from the journal box, a hydraulic torque converter including a casing enclosing and coaxial with said extension and secured to said journal box, spaced coaxial bearings formed of non-magnetic metal provided on the casing coaxial with said axle extension, a cylindrical sleeve formed of paramagnetic metal rotatably mounted on said bearings, an impeller secured on said sleeve to circulate liquid within the casing, a cylindrical housing formed of paramagnetic metal secured on said extension within said sleeve to define therewith an annular space, a coil within said housing to be energized from a source of electric current to produce a magnetic flux in said annular space between the housing and said sleeve, a mass of relatively movable paramagnetic particles in said annular space, leads connecting said coil to a source of electric current to subject said housing and sleeve and mass of paramagnetic particles to a magnetic field to produce a coupling force between said housing and sleeve, and means to vary the strength of said field to control said coupling force.

3. In a hydraulic torque converter, a fixed casing containing a constant volume of fluid, spaced coaxial bearings provided within said casing, a paramagnetic cylindrical sleeve journaled on said bearings, a rotatable member within said sleeve, an impeller secured on said sleeve operative to circulate said fluid in said casing, coupling means including a magnetic fluid clutch to produce a variable coupling force between said rotatable member and said sleeve, and control means for said coupling means operative to vary the coupling force to regulate the relative velocity between the impeller and casing to produce a substantially constant torque output during various speeds of the rotatable member.

4. In a hydraulic torque converter, a fixed casing containing a constant volume of fluid, spaced coaxial bearings provided within said casing, a paramagnetic cylindrical sleeve journaled on said bearings, a rotatable member within said sleeve, an impeller secured on said sleeve operative to circulate said fluid in said casing, coupling means including a magnetic fluid clutch to produce a variable coupling force between said rotatable member and said sleeve, and control means for said coupling means operative to regulate the relative velocity between the impeller and casing to produce a substantially constant torque output during various speeds of the rotatable member, said coupling means comprising a paramagnetic element secured on said rotatable member, a paramagnetic surface on said sleeve opposed to and closely spaced from said element, and a mass of relatively movable paramagnetic particles in the space between said element and said surface.

5. In a hydraulic torque converter, a fixed casing containing a constant volume of fluid, spaced coaxial bearings provided within said casing, a paramagnetic cylindrical sleeve journaled on said bearings, a rotatable member within said sleeve, an impeller secured on said sleeve operative to circulate said fluid in said casing, coupling means including a magnetic fluid clutch to produce a variable coupling force between said rotatable member and said sleeve, means comprising paramagnetic coaxial cylindrical surfaces on said rotatable member and said sleeve defining an annular gap therebetween, a mass of relatively movable paramagnetic particles in said gap between said surfaces, and means to produce a magnetic flux in said gap to cause the paramagnetic particles to produce a coupling force between said surfaces.

6. In a hydraulic torque converter, a fixed casing containing a constant volume of fluid, spaced coaxial bearings provided within said casing, a paramagnetic cylindrical sleeve journaled on said bearings, a rotatable member within said sleeve, an impeller secured on said sleeve operative to circulate said fluid in said casing, coupling means including a magnetic fluid clutch to produce a variable coupling force between said rotatable member and said sleeve, means comprising paramagnetic coaxial cylindrical surfaces on said rotatable member and said sleeve defining an annular gap therebetween, a mass of relatively movable paramagnetic particles in said gap between said surfaces, means to produce a magnetic flux in said gap to cause the paramagnetic particles to produce a coupling force between said surfaces, and means to vary the coupling forces between said surfaces.

7. In a hydraulic torque converter, a fixed casing to contain a constant volume of fluid, spaced coaxial bearings of non-magnetic material secured on said casing, a paramagnetic cylindrical sleeve journaled on said bearings, a rotatable member within said sleeve, an impeller of non-magnetic material secured on said sleeve operative to circulate said fluid in the casing, and means including a magnetic fluid clutch to produce a variable coupling force between said rotatable member and said sleeve.

References Cited in the file of this patent

UNITED STATES PATENTS

| | | |
|---|---|---|
| 2,055,297 | Lane | Sept. 22, 1936 |
| 2,453,811 | Pennington | Nov. 16, 1948 |
| 2,543,929 | Olman | Mar. 6, 1951 |
| 2,544,360 | Schmidt | Mar. 6, 1951 |
| 2,596,654 | Clark et al. | May 13, 1952 |
| 2,604,964 | Winther et al. | July 29, 1952 |
| 2,612,248 | Feiertag | Sept. 30, 1952 |
| 2,643,748 | White | June 30, 1953 |